United States Patent
Partanen

(10) Patent No.: US 11,862,766 B2
(45) Date of Patent: Jan. 2, 2024

(54) RECHARGEABLE ELECTROMAGNETIC INDUCTION BATTERY

(71) Applicant: Rainer Partanen, Helsinki (FI)

(72) Inventor: Rainer Partanen, Helsinki (FI)

(73) Assignee: Rainer Partanen, Helsinki (FI)

( * ) Notice: Subject to any disclaimer, the term of this patent is extended or adjusted under 35 U.S.C. 154(b) by 630 days.

(21) Appl. No.: 16/899,671

(22) Filed: Jun. 12, 2020

(65) Prior Publication Data

US 2021/0391592 A1  Dec. 16, 2021

(51) Int. Cl.
| | |
|---|---|
| H01M 10/058 | (2010.01) |
| H01M 10/6551 | (2014.01) |
| H01F 38/14 | (2006.01) |
| H01M 4/13 | (2010.01) |
| H01M 10/44 | (2006.01) |
| H02J 7/02 | (2016.01) |

(52) U.S. Cl.
CPC .......... *H01M 10/058* (2013.01); *H01F 38/14* (2013.01); *H01M 4/13* (2013.01); *H01M 10/44* (2013.01); *H01M 10/6551* (2015.04); *H02J 7/02* (2013.01); *H01M 2300/0031* (2013.01)

(58) Field of Classification Search
None
See application file for complete search history.

(56) References Cited

U.S. PATENT DOCUMENTS

| | | |
|---|---|---|
| 2009/0010462 A1 | 1/2009 | Ekchian et al. |
| 2012/0082904 A1 | 4/2012 | Brown et al. |
| 2012/0082905 A1 | 4/2012 | Brown et al. |
| 2022/0247015 A1* | 8/2022 | Du ................... H01M 10/6571 |

FOREIGN PATENT DOCUMENTS

| | | |
|---|---|---|
| CN | 207559639 U | 6/2018 |
| CN | 209516703 U | 10/2019 |
| WO | WO2021034423 A2 | 2/2009 |
| WO | WO2013049097 A1 | 4/2013 |

OTHER PUBLICATIONS

Meng-Change et al: An ultrafast rechargeable aluminum-ion battery. Nature, vol. 520. Apr. 2015, pp. 324-328.
Menthe et al: Surface and Coatings Technology. vol. 74-75, 1995, pp. 412-416.

* cited by examiner

*Primary Examiner* — Lucas J. O'Donnell
(74) *Attorney, Agent, or Firm* — Laine IP Oy

(57) ABSTRACT

According to an example aspect of the present invention, there is provided a rechargeable electromagnetic induction battery comprising: a first electrode, which comprises heat sink and an anode; a second electrode, which comprises heat sink and a cathode; an inductor coil; and an electrolytic solution contained between the first and second electrodes. Also, there is provided a method of charging an electromagnetic induction battery, comprising the steps of: attaching a voltage source to the battery, applying a direct current voltage to the battery for a first period of time, and applying an alternating current voltage to the battery for a second period of time, wherein the battery has an anode, cathode, inductor and an electrolytic solution comprising electrons, wherein the alternating current generates a magnetic field which excites the electrons in the electrolytic solution to an upper energy state.

21 Claims, 8 Drawing Sheets

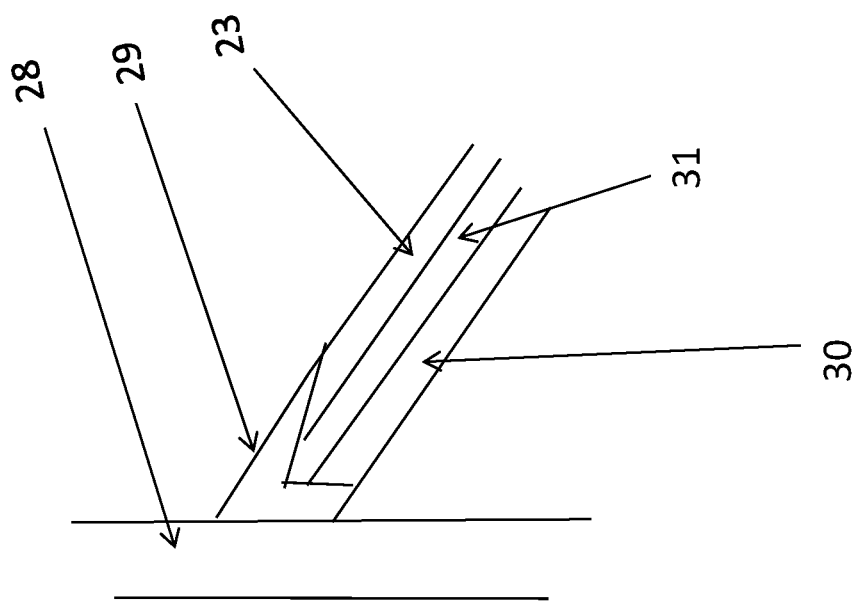

RECHARGEABLE ELECTROMAGNETIC INDUCTION BATTERY

FIELD

The present invention relates to battery that provides a high energy level. Furthermore, the invention relates to a method of charging a battery with a high energy level.

BACKGROUND

In recent years the development of batteries with improved performance has resulted in the use of technical solutions that may constitute risks to the user of batteries. The energy density of modern batteries is very high, where incorrect use or incorrect construction can have major negative consequences. For example, accidents involving lithium or lithium-ion batteries/accumulators have resulted in fires.

Examples of a construction in aluminum-based batteries with organic electrolyte and nano particles, carried out with vanadium oxide V2O5, are presented, for example, in WO 2013/049097 A1 wherein the cathode uses a nanowire technology. One problem with the invention shown in WO 2013/049097 A1 is that a complicated nanowire technology is used which is not suitable for mass production.

Examples of other possible electrolytes are provided, for example, in Brown et al., Patent application US 2012/0082904 and US 2012/0082905.

An example of construction in batteries with improved performance is given, for example, in the article "An ultra-fast rechargeable aluminum-ion battery", Meng-Chang et. al., Nature, #520, p. 324-328, published in April 2015. The article shows the development of a rechargeable aluminum-based battery system in which problems related to cathode disintegration, improved life cycle, and improved performance are presented. The article shows an aluminum battery that is quickly rechargeable with an aluminum anode and a three-dimensional graphite foam cathode. A battery cell has a discharge voltage of 2 V and a charging time of approximately 1 minute with a current density corresponding to 4 A/gr, which corresponds to 3 kW/kg, and can handle more than 7500 charging cycles without decreased performance. One problem with the battery cell shown in the article is the use of chemical substances with properties which are harmful to the health and/or harmful to the environment.

Plasma nitriding is particularly attractive because of its relatively high efficiency, even at low temperatures. For professionals such processes are well known from, for example, E. Menthe, K. T. Rie, J. W. Schultze and S. Simson, "Surface and Coatings Technology", vol. 74-75 (1995) 412-416.

The purpose of the present invention is to solve the above problems through the development of a simple environmentally friendly and safe battery with high technical performance. The present invention improves the battery through new technology, especially with the use of electrical technology with higher voltage and greater amount of current.

SUMMARY OF THE INVENTION

The invention is defined by the features of the independent claims. Some specific embodiments are defined in the dependent claims.

One purpose of the present invention is to provide the prior art with a rechargeable energy storage or battery that solves problems related to reduced charging time, better temperature performance, reduced utilization of hazardous chemical substances, higher energy density, simplified manufacturing method, and higher voltage and energy level. It can be used widely with various known organic electrolytes with different heavy metals, alkali or light metals. It can also be used with a high voltage and dense current.

At least some batteries according to the present invention are inductive devices which improve the function and increase the energy level with higher voltage compared to the batteries known in the prior art.

According to a first aspect of the present invention, there is provided a rechargeable electromagnetic induction battery (10) comprising:
 a first electrode (22), which comprises heat sink (31) and an anode (24);
 a second electrode (22), which comprises heat sink (31) and a cathode (23);
 an inductor coil (27); and
 an electrolytic solution contained (26) between the first and second electrodes (22),
 wherein the first and second electrode (22) have a top and a bottom,
 wherein the top has a first opening and the bottom has a second opening and the electrodes (22) are spaced apart on top of each other,
 wherein the first opening is smaller than the second opening,
 wherein the inductor coil (27) is located in the center of the electrodes (22),
 wherein the anode (24) is located at the top of the first electrode (22),
 wherein the first and second electrodes (22) have a capacitor voltage between them.

According to a second aspect of the present invention, there is provided a method of charging an electromagnetic induction battery (10), comprising the steps of:
 attaching a voltage source (100) to the battery (10),
 applying a direct current voltage to the battery for a first period of time,
 applying an alternating current voltage to the battery for a second period of time,
 wherein the battery has an anode, cathode, inductor and an electrolytic solution comprising electrons, wherein the alternating current generates a magnetic field which excites the electrons in the electrolytic solution to an upper energy state.

Other purposes of the present invention are described in more detail in connection with the detailed description of the invention.

According to further aspects of the improved construction according to the invention; the invention relates to a construction with electrodes that are divided into a cathode, a heat sink with an anode, and an inductor coil in the center.

BRIEF DESCRIPTION OF THE DRAWINGS

FIG. 8 illustrates a detailed enlargement of the top part of the bottom electrode in accordance with at least some embodiments of the present invention;

EMBODIMENTS

The invention relates to a battery comprising electrodes, which act as a capacitor, and electrolytic solution, and a coolant for hot conditions. The principle of the battery with electrodes shaped according to the invention is that the inductive device generates a magnetic field through an inductor coil, which rapidly changes direction and charges capacitor power between the electrodes.

Figure 1:
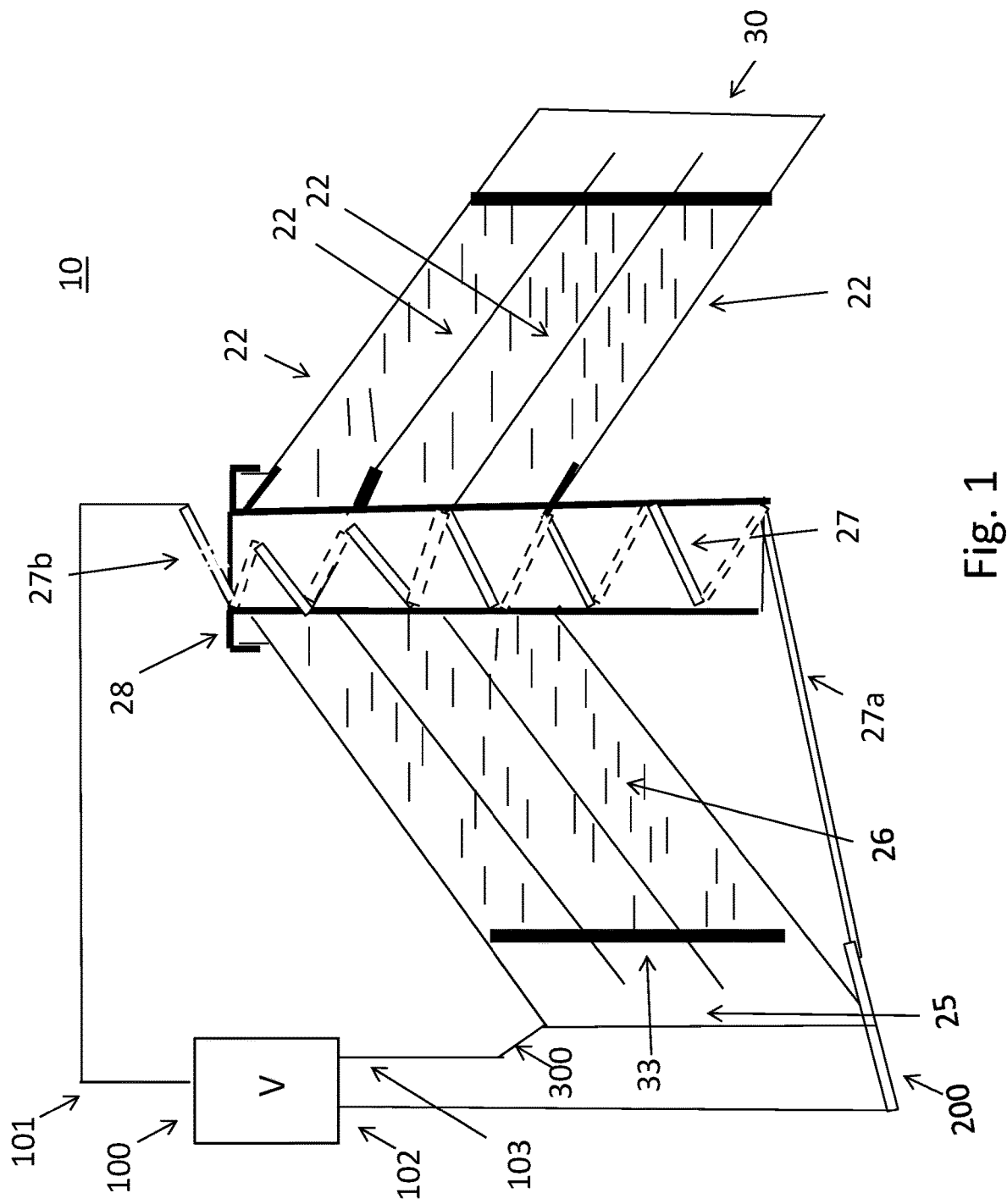
FIG. 1 illustrates a cross-sectional view of the battery in accordance with at least some embodiments of the present invention.

FIG. 1 shows a battery 10 according to at least one embodiment of the present invention. The battery 10 may also be referred to as an energy storage device, battery cell or an accumulator. The battery 10 comprises of an inductor coil 27, a tube 28, packing rings 33, a coolant 25 and electrode cones 22 which are surrounded by electrolytic solution 26. The packing rings 33, storage vessel 30 and tubes 28 jointly form a space where all the elements are.

The inductor coil 27, which is located in the tube 28, can also be referred to as an electrical conductor or inductor and is designed as an inductor or inductance and may also be carried out with a core of, for example, ferrite.

According to one embodiment, the inductor coil 27 is arranged so that it is enclosed in the battery 10 or in the electrode 22 between the heat sink 31 and the cathode 23 as a spiral inductor coil 27.

The electrolytic solution 26 is in liquid or gel form is illustrated in FIG. 1 by dashing. The electrolytic solution 26 is preferably an organic compound and with ion molecules, particularly various heavy metal molecular compounds.

The battery has multiple electrode cones 22. The embodiment illustrated in FIG. 1 shows three electrode pairs, but there may be more of fewer number of electrode pairs. The first electrode is illustrated in more detail in FIGS. 3 and 4, the identical second and third electrodes are illustrated in more detail in FIGS. 5 and 6 and the fourth electrode is illustrated in more detail in FIGS. 7 and 8. The size of the battery can be increased or decreased by adding or removing electrode cones similar to the second or third electrode. Also, when the size of the battery is increased or decreased, the size of the inductor coil 27, heat sink 31 and storage vessel 30 and the amount of coolant 25 and electrolytic solution 26 have to be changed accordingly.

The tube 28 may have a coil-shaped or spiral-shaped electric conductor. The inductor coil 27 is preferably formed of an electrically conductive metal, such as copper with lacquer on the surface or other metal with good conductivity. Further, the inductor coil 27 is electrically insulated with an insulating casing.

According to one embodiment, the battery 10 has a storage vessel 30 that further comprises of a lid, a bottom and packing rings 33. The storage vessel holds all the components of the battery 10 inside of itself. The coolant liquid 25 is located outside of the storage vessel 30. The coolant 25 and electrolytic solution are divided by the packing rings 33. The storage vessel 30 may have a Faraday cage which captures the magnetic flow.

When charging the battery 10, the voltage source 100 will be connected to the inductor coil 27. An electric circuit will generate a magnetic field with varying flow direction in the battery 10 and thus in the electrolytic solution 26. The electrical circuit is connected to the outputs 101, 102 of the voltage source 100. Outputs 101 and 102 have electrical performance, where an alternating current voltage is fed from output 101. The voltage source 100 is carried out with three outputs 101, 102 and 103. Output 101 connects to the second connector 27b of the inductor coil 27.

The output 103 connects to the anode side of first electrode cone 22. This reduces the light metal, which has a dense ion flow, with a dense direct current when the surface of the anode is small. The output 102 connects to the first connector 27a on the inductor coil 27 as well as to cathode side of the electrode 22. This increases the energy of molecules in the electrolytic solution 26 with alternating current to higher energy position and gives more electrons out of the molecule with direct current. The same process goes through all electrodes when charging and vice versa, when discharging.

Preferably, an AC source is utilized which, with a diode circuit or other rectifying circuit, creates a voltage which is half-wave rectified, full wave rectified, and/or with other pulse forms for charging. With a high duty cycle as an output voltage AC current creates a dynamically varying magnetic field in the electrolytic solution 26. As an electric alternating current has passed the inductor coil 27, a magnetic field is induced in the electrolytic solution 26, which brings the electrolytic solution 26 into a moving position and to a higher energy level when the electrons can be more easily released in the charging mode.

The energy storage is charged by the charging voltage. Outputs 102 and 103 are connected to pole connection plus 200 and pole connection minus 300 respectively. Since outputs 102 and 103 have different electrical potential, the direction of current will change when zero is passed, where the voltage source 100 gives the current change through the inductor coil 27 and will generate a swinging AC circuit.

The electrical conductor, inductor coil 27, at the first connection 27a of the inductor coil 27, connects to the cathode side of the bottom electrode 22. Further, the second connection 27b of the inductor coil 27 connects to output 101. A first pole connection comes from output 102 to plus 200 arranged to the cathode side of the bottom electrode 22 and the first connection 27a of the inductor coil. A second pole connection comes from output 103 to minus 300 which is arranged to the anode side of the top electrode 22. The first pole connection plus 200 and the second pole connection minus 300 are used to connect the battery to a charger and when the battery is connected to a load.

Figure 2:
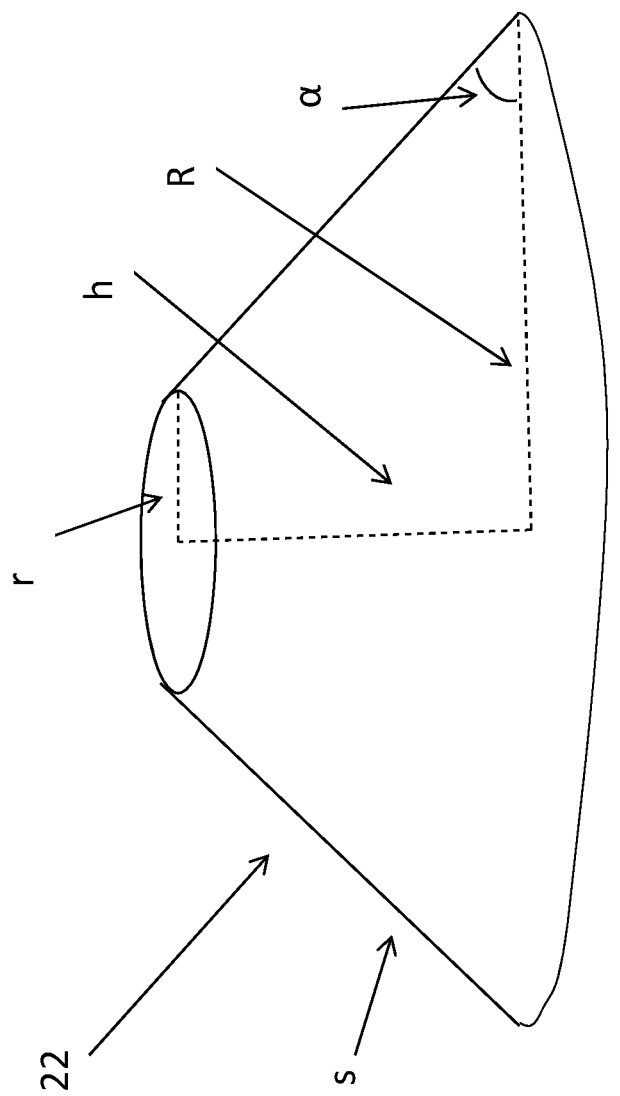
FIG. 2 illustrates the geometry of the battery in accordance with at least some embodiments of the present invention.

FIG. 2 shows the geometrical shape of the electrode 22. r describes the radius of the smaller circle which appears at the top of the truncated electrode cone 22. R indicates the radius of the larger circle which appears at the bottom of the truncated electrode cone 22. s indicates thickness of the mantle of the truncated electrode cone 22. h indicates the height of the truncated electrode cone 22. In an example of a design of an electrode 22 R is between 50 mm and 300 mm, r between 10 mm and 30 mm, s between 0.05 mm and 0.15 mm, h between 40 mm and 300 mm. The cone angle α is preferably 45° but the angle can also be different. The size of the cone and the thickness can be varied according to the areas of use of the battery.

Electrodes 22 are preferably carried out in the form of a truncated cone where the top of the cone is removed and insulated. The electrodes 22 can also be carried out in other forms, not necessarily conical, but they can also have a spherically rounded shape. The electrodes 22 need not have circular symmetry but can be, for example, elliptical, or pyramid shaped.

The cone is made, for example, by casting or made of a sheet which is curved, and/or made of screen. The thickness of the sheet and the screen wires are in the order of 0.05 mm but can also be either thicker or thinner. Furthermore, both the anode 24 and the cathode 23 are preferably coated with a chloride layer or nitride layer or with another coating, or the coating can be left out. However, the shape of the anode 24, heat sink 31, and cathode 23 and method of manufacturing are not limited by the above examples.

Figure 3:
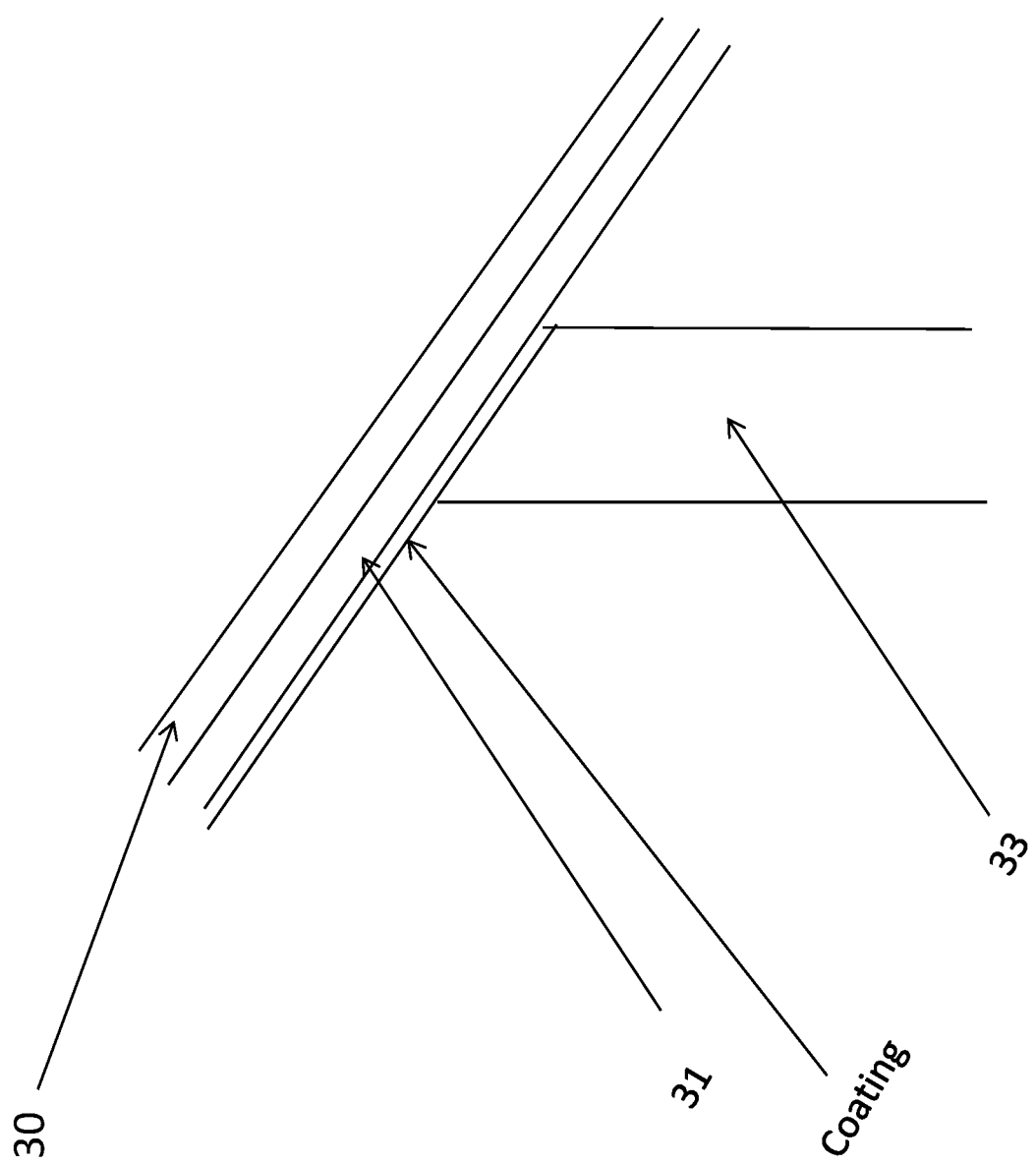
FIG. 3 illustrates a detailed enlargement of the bottom part of the top electrode in accordance with at least some embodiments of the present invention.

FIG. 3 shows a detailed enlargement of the outer part of the top electrode in accordance with at least some embodiments of the present invention. The top part of the electrode comprises of a heat sink 31, which is coated with a layer of plastic or lacquer. The packing ring 33 is located below the heat sink 31. There is a storage vessel 30 on top of the heat sink 31.

Figure 4:
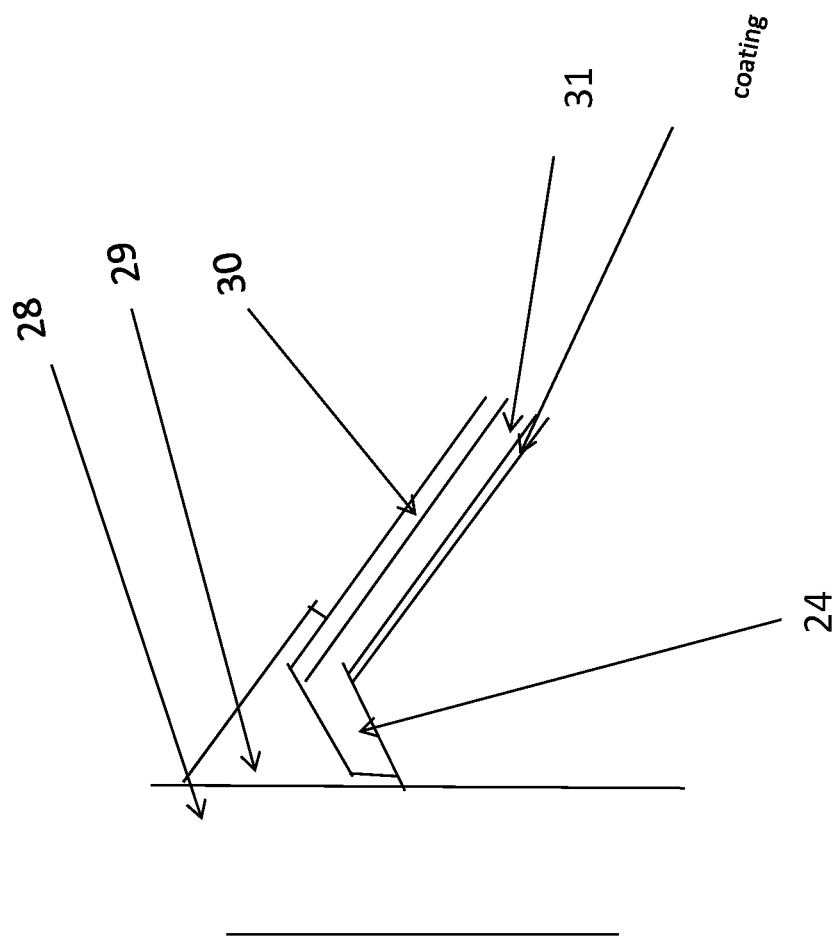
FIG. 4 illustrates a detailed enlargement of the top part of the top electrode in accordance with at least some embodiments of the present invention.

FIG. 4 shows a detailed enlargement of the inner part of the top electrode in accordance with at least some embodiments of the present invention. The electrode 22 is comprised of an anode 24, and heat sink 31. The side of the electrode 22 that is in contact with the tube 28 is insulated with insulation 29. On top of the heat sink 31 is the top part of the storage vessel 30. Below the heat sink 31 can be coated with a plastic of lacquer.

Figure 5:
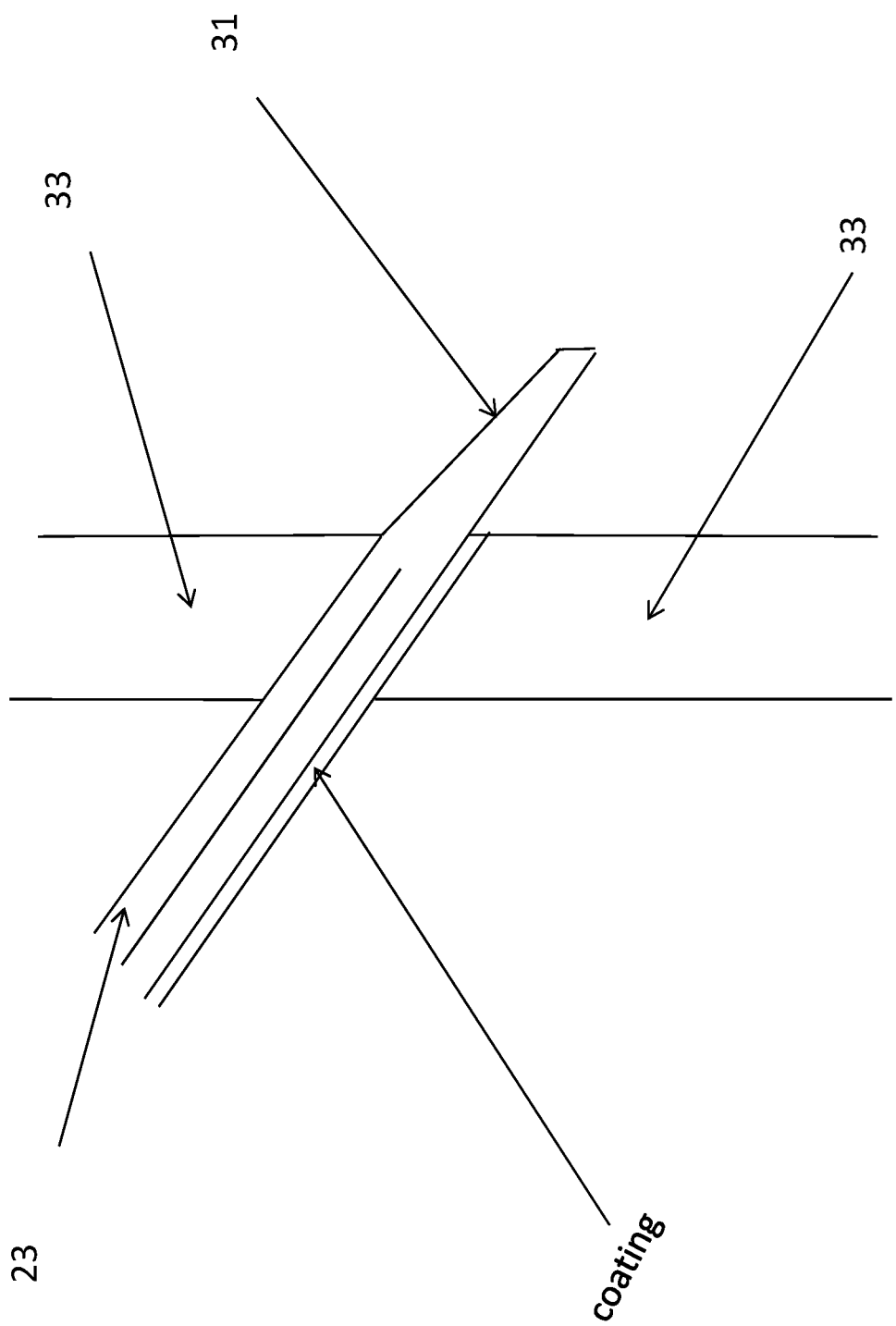
FIG. 5 illustrates a detailed enlargement of the bottom part of a middle electrode in accordance with at least some embodiments of the present invention.

FIG. 5 shows a detailed enlargement of the outer part of a middle electrode in accordance with at least some embodiments of the present invention. The upper side of the middle electrodes comprise a cathode 23. The cathode is in contact with the electrolytic solution 26. The lower side of the electrode is coated with a layer of plastic or lacquer. In between the cathode 23 and the coating there is located a heat sink 31.

Figure 6:
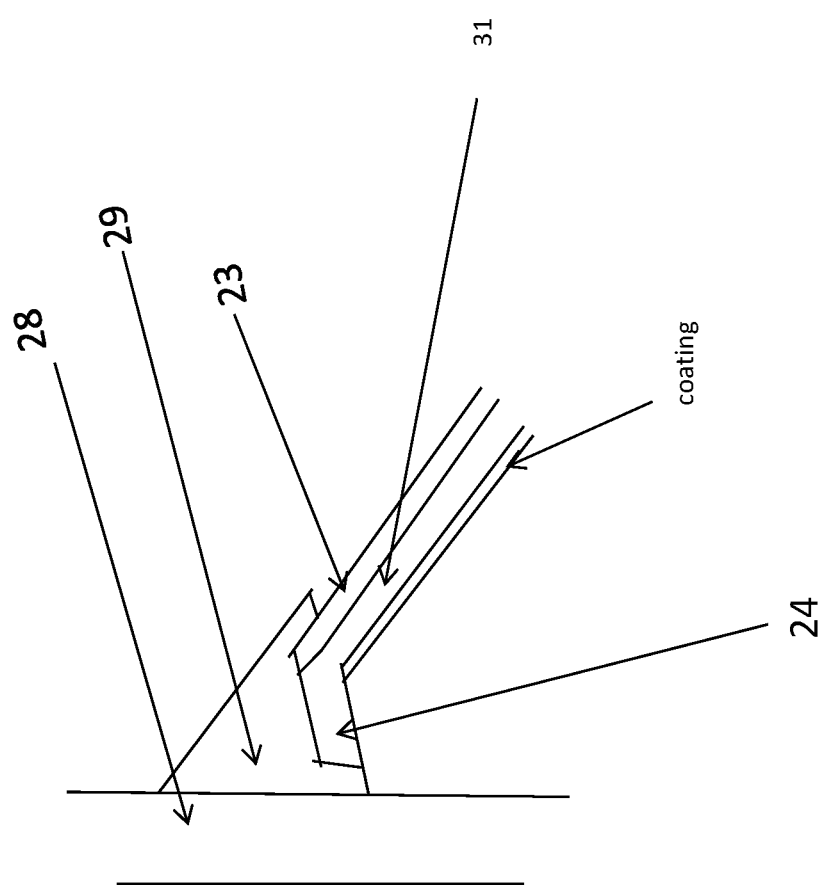
FIG. 6 illustrates a detailed enlargement of the top part of a middle electrode in accordance with at least some embodiments of the present invention.

FIG. 6 shows a detailed enlargement of the inner part of a middle electrode in accordance with at least some embodiments of the present invention. The middle electrodes comprise of an anode 24, a heat sink 31 and a cathode 23. Similarly to FIG. 4, the side of the electrode 22 that is in contact with the tube 28 is insulated with insulation 29. Below the heat sink 31 can be coated with a plastic of lacquer. Both the anode 24 and the cathode 23 are in contact with an electrolytic solution 26. The anode 24 is in contact with the electrolytic solution 26 located on the top side of the electrode 22 and the cathode 23 is in contact with the electrolytic solution 26 below the electrode 22.

Figure 7:
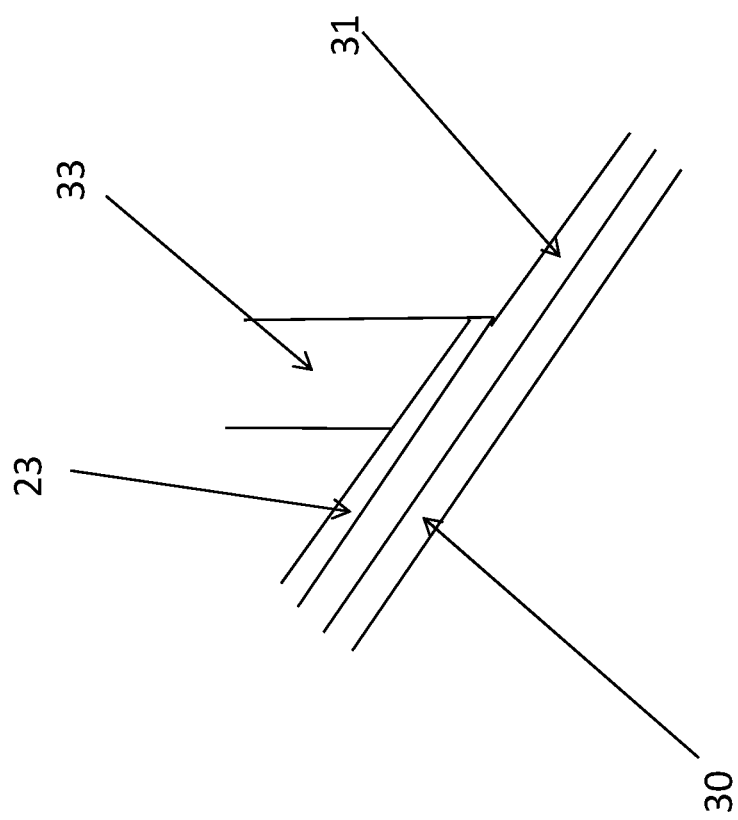
FIG. 7 illustrates a detailed enlargement of the bottom part of the bottom electrode in accordance with at least some embodiments of the present invention.

FIG. 7 shows a detailed enlargement of the outer part of the bottom electrode in accordance with at least some embodiments of the present invention. The bottom electrode 22 comprises a cathode 23, a heat sink 31 and the bottom storage vessel 30. The storage vessel goes up to the tube 28 and forms a bottom wall which forms a closed space for the electrolytic solution 26. Packing rings 33 separate the electrodes 22. The packing rings 33 are located at the bottom of the truncated electrode 22 cone. The packing rings 33 may be glued to all the electrodes 22 or fastened by another method. The packing rings 33 are made of electrically insulating material.

FIG. 8 shows a detailed enlargement of the inner part of the bottom electrode in accordance with at least some embodiments of the present invention. The bottom electrode comprises a cathode 23 and a heat sink 31. Similarly to FIGS. 4 and 6 the side of the electrode 22 that is in contact with the tube 28 is insulated with insulation 29. The cathode 23 is in contact with the electrolytic solution 26. The bottom storage vessel 30 is located below the heat sink 31. The bottom layer 30 is made of suitable plastic and together with the tube 28 forms a tight vessel which can comprise an electrolytic solution 26.

As seen from FIGS. 3, 5 and 7, the heat sink 31 is not limited only to the packing rings, but continues "over" them. This creates a thermal pathway along the length of the electrode which is not in contact with the electrolytic solution. As illustrated, the heat sink may be separated from the electrolytic solution via a coating.

The bottom and the top electrodes 22 are provided with a bottom and a lid of the storage vessel 30 and together with the storage vessel walls seen in FIG. 1 the whole vessel encloses all the components of the battery. The coolant 25 in the outer part of the storage vessel 30 may be glycol water mixture or any other coolant. Alternatively the circulation of the coolant 25 can be arranged to different cooling elements, outside the storage vessel 30. The storage vessel 30 may be made from electrically insulating material such as rubber, teflon, or other plastics, such as thermoset or thermoplastic materials.

As mentioned above, the battery 10 is charged by an external voltage source 100 with three outputs 101, 102 and 103. The output 101 feeds the inductive circuit with an alternating voltage or a square pulse or other electrical signal with current changing over time by connecting to the second connection 27b of the inductor coil 27. The magnetic flux change generates a magnetic field, which changes the energy state of the electrode cones 22. The magnetic field induces ion electrolytes in the electrolytic solution 26, which brings dense electric current to the surface of the anode 24 from the cathode and a dense ion flow from or to electrolytic solution 26 when charging and discharging respectively. This induces a reduction reaction to the anode 23 and charging can be done with a higher voltage. This enables fast charging and as a higher capacitor voltage in the battery 10. The voltage source 100 may be equipped with an adjustable frequency inverter/frequency converter which provides adjustable voltage in alternating current at a certain frequency and at different rates, adjustable voltage and adjustable direct current for charging.

In certain embodiments there can be several electrode cones on top of each other separated by packing rings 33. The electrode cones can partly be coated and partly uncoated. Each cathode surface has insulation 29 over that part of the surface which is arranged closest to the central tube 28. The thickness of this insulated part may be approximately 0.04-0.005% of the thickness of the mantle of the electrode 22, but also other size or thickness of insulation is possible and the invention is not limited by this. The insulation 29 may be a rubber seal or a rubber "collar", which may be comprised of plastic, thermoplastic or other insulator material.

The anode 24 and heat sink 31 are preferably made of light metal or aluminum or other suitable alloy. The cathode 23 is preferably made of heavy metal or stainless steel AISI 304, or a screen of acid-resistant steel AISI 316 or another alloy including substances and metals. In the electrodes 22 the heat sink 31 and the cathode 23 are preferably joined together by laser welding.

According to one embodiment, the material of the anode 24 and heat sink 31 of the battery 10 may be selected from metals in the group 1, 2 or 13 of the periodic table, especially any of the metals lithium, sodium, potassium, beryllium, magnesium, calcium, boron, aluminum, gallium, indium and/or thallium or alloys comprising any of the following materials: lithium, sodium, potassium, beryllium, magnesium, calcium, boron, aluminum, gallium, indium and/or thallium. The anode 24 and the heat sink 31 are preferably coated with chlorides or some other coating. Preferably, the battery 10, anode 24 and heat sink 31 electrode are made of high purity aluminum or made of a suitable alloy, for example an aluminum alloy. The anode electrode can be produced, for example, by casting.

According to one embodiment, the material of the cathode 23 is selected from the group of heavy metals, for example any of the following materials: nickel, cobalt, iron, manganese, chrome, molybdenum, or stainless or acid-resistant alloys comprising any of the following materials: nickel, cobalt, iron, manganese, chrome, molybdenum, or steel alloys, preferably coated with nitride or some other coating or from finished alloys of stainless steel or acid-resistant steel Aisi 304-316, possibly with a nitride coating, or other substances.

Examples of materials in the electrodes are various forms of chlorides and nitrides. In addition to various forms of nitrides, the surface of the electrode may also be provided with a chloride and nitride coating in order to further improve its properties. Industrial chloriding and nitriding processes for coating surfaces are usually carried out with gas techniques, plasma supported techniques, or chloriding with salt bath techniques.

The electrolytic solution 26 may comprise nitride, ammonium, chloride and oxide molecules which comprises molecules which comprise basic elements in an organic solvent. According to one embodiment, the electrolytic solution comprises $AlCl_3$, manganese ions or iron ions, and an organic solvent.

The anode 24 part of the electrode 22 can have a very small surface in the scale of $mm^2$. The cathode 23 part of the electrode 22 can have a very large surface in the scale of $cm^2$ or $m^2$. The surfaces may vary in size and are not tied to any exact size. The difference between the surface size of the anode 24 and the cathode 23 may be in the scale of $1M\ mm^2$. According to one embodiment the ratio between the surface areas of the cathode and anode is in the range of 100-100 000.

The anode 24 and the cathode 23 are not arranged against each other; instead they are at an angle next to each other. Both are in contact with the electrolytic solution 26 and the top of the large cathode 23 is insulated with and insulator 29.

One advantage of this invention is that when the battery is charged there is a capacitor voltage constantly in the battery 10 from the cathode 23 and heat sink 31 to the anode 24 through the electrolytic solution 26. The same voltage prevails in all electrodes 22 when there is still charge in the battery.

According to one embodiment, the charging and discharging of the battery 10 generates a dense ion flow and dense electrical current to the top of the electrode 22 to the anode 24. The anode then reduces ion molecules from the cathode 23 to metal.

According to one embodiment, the battery 10 comprises of conically shaped electrodes 22 having an inner opening. Insulation 29 is arranged close to the inner opening of the electrodes 22. The bottom opening of the electrodes 22 are separated with packing rings 33. The electrodes comprise a heat sink 31 that is made of aluminum and an anode that has a coating of an aluminum chloride on its surface.

The elements of the battery 10 act as a capacitor having a voltage between the electrodes 22. The heat sink 31 is coated with plastic or lacquer. The battery 10 is an inductive device and has a minus pole 300 and a plus pole 200. The battery 10 is charged with direct current from the voltage source 100 for 0.5 s. For another 0.5 s, the electrical conductor is driven with alternating current. The inductor coil 27 creates a varying magnetic field to the battery 10 and the electrolytic solution 26.

Output 102 of the voltage source 100 is attached to the plus pole connection 200 of the battery. As the half-wave rectified signal from the voltage source 100 is changed to alternating current, the current will flow in varying direction directly from the output 101 of the voltage source 100 through the inductor coil 27 to the output 102 of the voltage source 100 and back at a rate of 50 kHz/s. This causes the magnetic field in the circuit to change dynamically, which activates, or induces, energy and causes the electrons of the metal compounds in the electrolytic solution to move to a higher energy level, and the electrons can then be easily released. At the energy charging rate of 0.5/s, to inductive power, of electrolyte molecules which move to a higher energy state, at the same time, the ion function is good at higher heat states between anode 24 and cathode 23.

The voltage source 100 has current of 10-100 $A/cm^2$ and voltage of 7.5-10 V. The battery is a 230-360 V inductive device. This can be regulated and such a battery can be produced for all needs and purposes.

A high duty cycle indicates that a high percentage of the signal from output 101 of the voltage source 100 is active. Preferably, the duty cycle is >90% for signal 101. Because the output voltage from output 101 goes through zero passes, the current changes direction which, in turn, creates a changing magnetic field in the inductor coil 27. The frequency, current, pulse shape and voltage vary depending on the design of the battery 10 but can be in the output voltage range of 2-7.5 V/pair of inductive device 230-360 V or greater, and current of 0.1-100 A/s per pair, preferably 3-100 A/s per pair, such as 10 100 A/s per pair and the frequency of the output voltage between 1-50 kHz.

The rate between direct current, alternating current and back can be different, for example from 0.1/s to 1.0/s. The inductive device current to the inductor coil 27 and the voltage are approximately 1-3 A and 230-360 V. Capacitor and charging voltage in one pair or with several pairs can be from 10 V in one pair to several pairs in the range of 230-360 V or more. It works with the voltage/couple used and the current when charging from 0.1-100 A, preferably 1.0-10 A, such as 1.0-100 A or more, depending on the size of the storage vessel 30 and which substances are used in the electrolytic solution 26.

In an embodiment of the present invention the charging voltage is 2 V/pair and current 125 mA/g. In the current invention the voltage is 10 V and inductive device with 230-360 V, discharge voltage 1.8 V with 305 mAh/g. In the current invention another possible voltage is 7.5 V inductive device 230-360 V, and double current.

The voltage in the battery 10 is higher and the current is high when charging or discharging with 10-7.5 V inductive device 230-360 V.

In an embodiment of the present invention, in the battery 10 there is a discharge reaction where aluminum is chlorinated and oxidized, and the $V_2O_5$ and $MnO_2$ in the electrolytic solution decrease to lower oxidation, which can be increased when charging to Mn7+, and Fe 3+ to Fe6+, which gives more current and higher voltage.

Reduction of aluminum is powerful and efficient because the cone top has a smaller surface area at aluminum anode 24 and in the electrolytic solution 26. As a result the ion flow is denser at the anode 24.

The battery 10 functions as a conventional energy storage or battery construction, but differs regarding high voltage which increases the energy amount with an inductive device and capacitor voltage, which are good in cold climate. It can be used with different molecules in the electrolytic solutions, with organic electrolyte, with different voltage and current in different chargeable batteries or energy storages.

When charging, it is an advantage of the battery 10 that the anode 24 has a small surface and the cathode 23 has a large surface. The cathode 23 and the molecules in the electrolytic solution 26 are charged with high-voltage, 10-360 V. The anode 24 receives alkali or light metal ions with a dense current, which reduces the ions. The charging current varies and temporarily becomes zero and goes through zero passes, possibly after a certain variable time delay. The inductive device generates an increased magnetic field in the inductor coil 27, which changes the state of energy in the electrolytic solution 26 and increases the magnetic flux in heavy metal cathode molecules to a higher energy state when electrons are delivered to the cathode 23.

Another advantage is that the battery 10 with electrodes 22 have a voltage between the electrodes 22 when charging and discharging, more precisely the voltage is between cathode 23 and heat sink 31. When the dense ion flow at anode 23 passes through the electrolytic solution, the electrons in the molecules change shell and emits electrons to the cathode 23.

According to one embodiment, the electrodes 22 act as a capacitor. More precisely the cathode 23 and the heat sink 31 act as a capacitor.

The electrolytic solution 26 is comprised of atoms and molecules. Although these are outwardly electrically neutral, they comprise protons (positive charge) and electrons (negative charge). In addition, the insulating 29 material may also comprise a small amount of free charge carriers (electrons or ions). When such a substance is exposed to an external electric field, the electrical equilibrium is disturbed. The positively charged particles move slightly in the direction of the field and the negatively charged particles move in the opposite direction. When the direction of the external electric field is reversed, a corresponding displacement occurs in the other direction. The faster the direction of the field is reversed, and the stronger the electric field is, the faster and larger these changes are. Due to this vibration of the charges inside the substance, it becomes hot.

Energy is transferred from the electric field to the material that is supposed to increase energy to the atom and the electron as the molecule is simultaneously heated.

Energy transfer depends not only on the frequency and field strength used, but also on the substance itself. This is illustrated by $\varepsilon r \cdot \tan \delta$. These factors depend not only on the material to be heated, but also on the frequency used.

The battery 10 operates in four modes, a first mode when the energy storage is charged and a second mode when the energy storage is discharged and a third mode when the battery or energy storage is not used, and a fourth mode when the battery or energy storage has no current or the voltage is 0.

In the first mode, charging, the external voltage source 100 is used to supply electrical energy to the electrolytic solution 26 between the cathode 23 and the anode 24. Charging takes place partly through a conventional electrochemically reversible reaction and partly by an inductive method where the magnetic field generated by the inductor coil 27 changes the energy state of the electrolytic solution 26. In other words, partly by heating the electrolytic solution 26, and partly because molecules comprised in the electrolytic solution 26 change energy states by the electrons in the molecules changing shells and electrons moving to the current.

In the second mode, discharging can also be take place through the voltage source 100, which changes the direct current to an adjustable alternating current that goes to a load.

In the third mode, in rest, there is no current in the battery 10, but the capacitor voltage works all the time and keeps the energy storage ready to start. The battery is in good balance.

In the fourth mode, the battery 10 is totally empty of current voltage and no capacitor voltage is present in the battery either.

The electrolytic solution 26 comprises both an anolyte and a catholyte, as well as organic liquids, gels or masses in solid form.

The electrolytic solution 26 can partly comprise nitride, ammonium, chloride and oxide molecules, which comprise molecules comprising basic elements.

The catholyte molecules of the electrolytic solution 26 may comprise different forms of metal compounds including a number of electrons which can be excited to higher energy levels with a varying magnetic field and direct current.

The anolyte molecules of the electrolytic solution 26 may comprise different metal compounds or other molecules suitable for the purpose. The anolyte molecules can be ionized with a varying magnetic field and direct current.

The voltage source 100 is designed to generate an output voltage of outputs 101, 102 and 103, which can be adjusted based on existing needs. For example, the pulse shape, rise time, frequency, voltage, pulse length and additional capacities can be varied in method inductor coil 27 with inductive device. The voltage source 100 can also be utilized to heat and lift the molecules of the battery 10 to higher energy level in order to improve the capacity of the battery, for example in cold climate.

In this case, the voltage source 100 is arranged to supply an alternating voltage of a slightly higher frequency, to generate a magnetic field which heats the electrolytic solution 26. For example, frequencies in the order of some kHz can be used, but also higher as well as lower frequencies of the voltage source 100 can be used to heat the electrolytic solution 26 and lift the molecules in the electrolytic solution 26 to a higher energy level. The electrons can then be more easily released during charging and thus improve the charging capacity and charging time.

The battery 10 according to one embodiment of the present invention is preferably in the order of 80 kg or 60 liters, but other sizes are also applicable. The battery 10 is preferably used in vehicles such as cars, boats, aircraft and other purposes, with room for one or more batteries or battery cells or large energy storages.

The battery 10 is adapted for 230-360 V and is preferably built of a number of electrodes 22 where each electrode has a charge/discharge voltage of at least approximately 7.5-15, V, preferably 10-15 V inductive device with high voltage of 230-360 V and discharge voltage of 7.5-15, preferably 10-15 V per electrode pair, and a charge/discharge current of approximately 0.2-10 $A/cm^2$, preferably 3-10 A/cm2. The charging time to reach 80% energy level is about 2-4 hours but the time interval may also be different depending on the design of the energy storage and the materials used.

The energy capacity of the battery 10 is possibly in the order of approximately 1.0-5.0 kWh/kg or approximately 2.0-5.6 kWh/liter, depending on the materials used. The power capacity of the battery 10 is in the order of approximately 125-500 Ah/kg or approximately 175-1000 Ah/litre. Depending on which chemicals are used in the electrolytic solution 26.

The number of charge cycles for the battery 10 may exceed 3,000-10,000, but the number of charge cycles can be extended by servicing the battery, for example by changing electrodes, electrolytic solution or other components in the battery.

Examples

The electrolytic solution used was 1-ethyl-3-methylimidazolium chloride ([EMim]Cl) with aluminum chloride ($AlCl_3$).

Charging takes place with direct current and alternating current from current bridge V 100 which gets its power from a power station. The cathode is, to Aisi 316 steel cathode 1), $MnO_2$, to $Mn^{7+}2$) $Fe_2O_3$, to $Fe^{6+}$ which takes electrons from the electrolytic solution 26, which is charged with organic electrolyte and ionic substances 1) $AlCl_3$, ion reduction to aluminum anode which only starts operating above 8.0 volts/pair of voltage, with 2) $AlCl_3$, $MgCl_2$.

Charging takes place with a drive voltage of 10-15 volts/pair of minimum, the same voltage in the capacitor, in both variations and inductive device 230 volts, 50,000 Hz alternating current with 1-3 A in the inductor coil 27, which produces magnetic power in the electrolytic solution 26 that is charged in the largest possible energy position, the voltage decreases when discharging with 7.5 volts/pair and capacitor 7.5 volts/pair, inductive device 230 volts in inductor coil 27, drive voltage from +acid-resistant cathode 23 which is partly coated, and anode 24/heat sink 31 poles, discharging renders current with high voltage from cathode 23 and anode 24.

The energy capacity of the battery 10 is possibly in the order of approximately 1.0-3.0 kWh/kg or approximately 2.0-5.6 kWh/litre, with different heavy metal compounds.

The battery 10 has the same or better minimum energy density of (270-310 mAhr/g, at least about 260 mAhr/g) than the invention of the Cornell University in New York, with the same organic electrolyte and in its aluminum ion battery WO 2013/049097 A1, without its nanowire invention. The finished test results agree well with those described in the patent application WO 2013/049097 A1, that is, in minimum function for battery 10, when using the same electrolyte substances and mass as in the described patent application by Cornell University NY, US.

A test result, it is in the minimum function for storage vessel 30 with the battery 10 and the chemical substances of triflate in PC/THF and 1-Ethyl-3-methylimidozolium chloride+AlCl3, and possibly (TMPAC) ionic liquid and mass of MnO2. The battery has the charging voltage of 10.0 V inductive device 360-230 V, current is 125 mA/g minimum and a discharge voltage of 1.8 V. For example −7.5— inductive device 230-360 V, current 305 mAh/g. The capacitor voltage used is 10 V.

This with charging and discharging higher voltage 10-7.5, inductive device with higher voltage 230-360 V and high current A in the battery 10. In the battery 10 the capacitor voltage at discharge is the one used in charging with an inductive device, and using the previously explained current and voltage.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention can be used in batteries for cars, boats or aircrafts, or other subjects that use one or more batteries.

Acronyms List

DC Direct current

REFERENCE SIGNS LIST

10 Battery
22 Electrode cone
23 Cathode
24 Anode
25 Coolant
26 Electrolytic solution
27 Inductor coil
27a First connection of inductor coil
27b Second connection of inductor coil
28 Tube
29 Insulation
30 Storage vessel
31 Heat sink
33 Packing ring
100 Voltage source
101 Output
102 Output
103 Output
200 Plus pole
300 Minus pole

CITATION LIST

Patent Literature

WO 2013/049097
US 2012/0082904

Non Patent Literature

"An ultrafast rechargeable aluminum-ion battery", Meng-Chang et. al., Nature, #520, p. 324-328, published in April 2015

E. Menthe, K. T. Rie, J. W. Schultze and S. Simson, "Surface and Coatings Technology", vol. 74-75 (1995) 412-416

The invention claimed is:

1. A rechargeable electromagnetic induction battery comprising:
   a first electrode comprising a heat sink and an anode;
   a second electrode comprising a heat sink and a cathode, wherein the first electrode is positioned over the second electrode;
   an inductor coil; and
   an electrolytic solution contained between the first and second electrodes,
   wherein the first and second electrode each comprise a body extending from a base portion to a top portion thereof, the top portion being smaller than the base portion,
   wherein the top portion of each electrode has a first opening and the base portion of each electrode has a second opening, the first opening having a smaller diameter relative to the second opening of each electrode,
   wherein the inductor coil extends through the first and second openings of each of the first and second electrodes, and
   wherein the anode is located at the top portion of the first electrode.

2. The battery according to claim 1, wherein the inductor coil is separated from the electrolytic solution.

3. The battery according to claim 1, wherein the electrodes are shaped liked a truncated cone, half sphere or a pyramid.

4. The battery according to claim 1, further comprising at least one additional electrode, which comprises an anode, a heat sink and a cathode.

5. The battery according to claim 4, wherein the at least one additional electrode is located between the first and second electrode so that the electrolytic solution surrounds the at least one additional electrode on both sides.

6. The battery according to claim 1, wherein the anode has a first surface, the cathode has a second surface and a surface area ratio between the first and second surface is in the range of 100-100,000.

7. The battery according to claim 1, wherein the material of the anode is selected from the group consisting of lithium, sodium, potassium, beryllium, magnesium, calcium, boron, aluminum, gallium, indium and thallium, and alloys comprising any of the following materials: lithium, sodium, potassium, beryllium, magnesium, calcium, boron, aluminum, gallium, indium and/or thallium.

8. The battery according to claim 1, wherein the material of the cathode is selected from the group consisting of nickel, cobalt, iron, manganese, chrome, molybdenum, and stainless or acid-resistant alloys comprising any of the following materials: nickel, cobalt, iron, manganese, chrome, molybdenum, or steel alloys.

9. The battery according to claim 1, wherein the material of the heat sink is selected from the group consisting of lithium, sodium, potassium, beryllium, magnesium, calcium, boron, aluminum, gallium, indium and thallium, and alloys comprising any of the following materials: lithium, sodium, potassium, beryllium, magnesium, calcium, boron, aluminum, gallium, indium and/or thallium.

10. The battery according to claim 1, wherein the electrolytic solution comprises nitride, ammonium, chloride and oxide molecules which comprise molecules of heavy metals and/or light metals.

11. The battery according to claim 1, wherein the inductor coil is formed of an electrically conductive metal.

12. The battery according to claim 1, wherein the inductor coil is formed of copper.

13. The battery according to claim 1, wherein the first and second electrode are separated by a packing ring, the packing ring further serving to contain the electrolytic solution.

14. The battery according to claim 1, wherein the heat sink on the first electrode and the cathode of the second electrode act as a capacitor.

15. A method of charging an electromagnetic induction battery, comprising the steps of:
   attaching a voltage source to the battery according to claim 1,
   applying a direct current voltage to the battery for a first period of time, and
   applying an alternating current voltage to the battery for a second period of time,
   wherein the alternating current generates a magnetic field which excites the electrons in the electrolytic solution to an upper energy state.

16. The method according to claim 15, wherein the first time period is 0.1-1.0 seconds and the second time period is 0.1-1.0 seconds.

17. The method according to claim 15, wherein the voltage of the direct current is 1-10 V.

18. The method according to claim 15, wherein the frequency of the alternating current is 1,000-50,000 Hz.

19. The method according to claim 15, wherein the direct current voltage is applied to a first set of inputs of the battery and the alternating current voltage is applied to a second set of inputs.

20. The method according to claim 15, wherein the first and second periods of time vary as the battery is charged.

21. A rechargeable electromagnetic induction battery comprising:
- an inductor coil;
- a plurality of electrodes stacked on one another to form an electrode stack, wherein the electrode stack surrounds the inductor coil such that the inductor coil extends through a body of each of the plurality of electrodes, and wherein each electrode of the plurality of electrodes comprises a cathode and/or an anode and a heat sink; and
- an electrolytic solution between each pair of the plurality of electrodes,
- wherein, upon the application of an alternating current to the battery, a magnetic field is generated through the inductor coil that activates the electrolytic solution and excites electrons in the electrolytic solution to a higher energy state.

* * * * *